United States Patent [19]
Brisson

[11] Patent Number: 5,123,052
[45] Date of Patent: Jun. 16, 1992

[54] METHOD AND APPARATUS FOR REDUCING THE ATTENUATION AND PHASE SHIFT OF LOW FREQUENCY COMPONENTS OF AUDIO SIGNALS

[76] Inventor: Bruce A. Brisson, 3037 Grass Valley Hwy., Auburn, Calif. 95603

[21] Appl. No.: 473,647

[22] Filed: Feb. 1, 1990

[51] Int. Cl.[5] .............................................. H04B 3/00
[52] U.S. Cl. ............................................ 381/77; 381/97
[58] Field of Search ........................ 381/97, 98, 99, 17

[56] References Cited

U.S. PATENT DOCUMENTS

| | | | |
|---|---|---|---|
| 3,838,215 | 9/1974 | Haynes, Jr. | 381/99 |
| 3,849,602 | 11/1974 | Gendin | 381/98 |
| 4,031,318 | 6/1977 | Pitre | 381/99 |
| 4,282,402 | 8/1981 | Liontonia | 381/99 |
| 4,475,233 | 10/1984 | Watkins | 381/99 |
| 4,593,405 | 6/1986 | Frye et al. | 381/99 |
| 4,653,096 | 3/1987 | Yokoyama | 381/17 |

FOREIGN PATENT DOCUMENTS 2068680  8/1981  United Kingdom ................. 381/98

*Primary Examiner*—Forester W. Isen
*Attorney, Agent, or Firm*—Fliesler, Dubb, Meyer & Lovejoy

[57] ABSTRACT

In an audio signal transmission system having a source of audio signals and a load coupled thereto by means of a first and second transmission line, a discrete capacitor is coupled in parallel with one or both of the transmission lines. The magnitude of the capacitor is as large as stable operation of the amplifier to which it is connected will permit.

10 Claims, 2 Drawing Sheets

METHOD AND APPARATUS FOR REDUCING THE ATTENUATION AND PHASE SHIFT OF LOW FREQUENCY COMPONENTS OF AUDIO SIGNALS

BACKGROUND OF THE INVENTION

1. Field of the Invention

The present invention relates to audio frequency signal transmission systems in general and in particular to an audio frequency signal transmission line and a method of making the same comprising means for reducing attenuation and phase shift of low frequency components of audio signals relative to high frequency components of audio signals which are transmitted between a source of audio signals and a load by means of a pair of electrical conductors.

2. Description of the Prior Art

An audio signal transmission system of the type to which the present invention relates comprises a source of audio signals coupled to a load by means of a first and a second electrical conductor. For example, the audio signal source may comprise an audio signal preamplifier, a power amplifier, a transducer or the like, for providing signals in the audio frequency spectrum; the load may comprise a preamplifier, a power amplifier, a speaker or other load depending on the source; and the first and second electrical conductors may comprise a pair of parallel untwisted insulated wires, a pair of twisted insulated wires, or a coaxial cable.

The audio frequency spectrum is generally considered to encompass a frequency range of from 20 Hz to 20,000 Hz.

Various means have been proposed for improving the transmission of audio signals between amplifiers, between an amplifier and a speaker, and between other audio signal sources and a load. For example, in U.S. Pat. No. 4,177,431, there is provided an interface circuit for suppressing noise between a power amplifier and a speaker coupled thereto by a "super speaker" cable. The interface circuit comprises a series coupled capacitor and resistor which is coupled across the input terminals of the speaker at the output end of the super speaker cable for providing an interface between the super speaker cable, which has a low characteristic impedance, e.g. 9 ohms, and the speaker, which also has a low characteristic impedance of 4-6 ohms over the audio frequency range. In applicant's co-pending U.S. patent application entitled "Audio Signal Transmission System With Noise Suppression Network", Ser. No. 07/354,517, filed May 18, 1989, there is disclosed an audible noise suppression interface circuit comprising an RC network which is coupled across the output terminals of an audio signal source at the input end of an audio signal transmission line. This interface circuit suppresses noise in the audio spectrum which would otherwise be generated by either the transmission line or load becoming momentarily open-circuited in response to certain low frequency signals. In applicant's U.S. Pat. No. 4,718,100, there is disclosed a method and apparatus for reducing phase shift between high and low frequency components of audio signals transmitted between a signal source and a load. In applicant's patent the method and apparatus disclosed comprises one or more electrical conductors for providing additional distributed capacitance along one or both of two transmission lines coupling a source of audio signals to a load. In each case, one end of the electrical conductor providing the additional distributed capacitance is connected to either a terminal of the source or a terminal of the load while the other end of the electrical conductor is left unterminated.

SUMMARY OF THE INVENTION

In view of the foregoing, the present invention comprises an alternate and, in certain respects, an improved method and apparatus for improving the transmission of audio signals between an audio signal source and a load. Specifically, the invention comprises an improved method and apparatus for reducing attenuation and phase shift of low frequency components of audio signals relative to high frequency components of said audio signals being transmitted between a source of said audio signals and a load such that the node at which the input impedance of said line changes from being an inductive impedance to a capacitive impedance and from a capacitive impedance to an inductive impedance is located substantially outside of the audio frequency spectrum.

In the course of investigating the quality of audio signal transmissions between a source of audio signals, such as a power amplifier, and a load, such as a speaker, an undesirable amount of attenuation and phase shift of the low frequency components relative to the high frequency components of the audio signals was observed. In an investigation of the physical mechanisms which give rise to the observed attenuation and phase shift, it was discovered that a voltage applied to the signal transmission line is stored in the capacitive field of the cable dielectric, the capacitive reactance of which naturally increases as the frequency of the signal being transmitted decreases. This phenomena was discovered to exist in short as well as long transmission lines carrying low level signals, e.g. less than 500 millivolts, as well as in short and long transmission lines transmitting high level signals, e.g. 0-250 volts.

Following the above-described investigation, it was further observed that the attenuation and phase shift of low frequency components of the transmitted audio signals relative to the high frequency components thereof were reduced by coupling a capacitance in parallel with at least one of the wires in the transmission line.

Thus, in accordance with the above observations, there is provided in a first embodiment of the present invention a method and apparatus comprising an audio frequency signal transmission line having a first and a second continuous electrical conductor with a discrete capacitor coupled in parallel with one of the conductors. Each of the conductors is provided for connecting one of the terminals of an audio frequency signal source, i.e. either the positive or negative terminal, to a corresponding terminal of a load.

In another embodiment of the present invention, there is provided a method and apparatus comprising an audio frequency signal transmission line having a first and a second continuous electrical conductor for connecting, respectively, the positive and negative terminals of a signal source to corresponding terminals of a load wherein a first discrete capacitor is coupled in parallel with said first electrical conductor and a second discrete capacitor is coupled in parallel with said second electrical conductor.

In a third embodiment of the present invention there is provided a method and apparatus comprising an audio frequency signal transmission line having a first and a second continuous helical electrical conductor, a third electrical conductor, and a discrete capacitor coupled in parallel with said first electrical conductor for connecting a source of audio frequency signals and a load. In the use of this embodiment, the positive and negative terminals of the signal source are coupled to the positive and negative terminals of the load, respectively, by means of the first and the second helical electrical conductor, respectively. The third electrical conductor is coupled to the positive terminal of the signal source and extends along the axis of the second helical electrical conductor. The opposite end of the third conductor remains unterminated.

In the use of each of the above-described embodiments it is found that the attenuation and phase shift of the low frequency components relative to the high frequency components of the audio signals transmitted between the audio signal source and the load are reduced when a discrete capacitor is connected in parallel with one or both of the transmission lines as described. It is also found that the amount of reduction appears to increase directly in proportion to the magnitude of the capacitor, such that the largest capacitor possible, which is consistent with stable amplifier operation, should be used.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

As is well known, the current through a perfect inductor lags the applied voltage by 90 degrees, whereas in a perfect capacitor, the current leads the applied voltage by 90 degrees.

A conventional audio signal transmission line comprises a pair of electrically insulated wires. The line, being neither a perfect inductor or a perfect capacitor, can appear to an audio signal source as either an inductive load or a capacitive load depending on the frequency of the applied audio signal. What was surprising, however, as shown by an investigation of the characteristics of the line over the audio spectrum, was that a typical audio signal transmission line can switch from being an inductive load to a capacitive load and from a capacitive load to an inductive load at relatively low frequencies, with an accompanying switch in the relative phase of the current and applied voltage producing undesirable distortions in the audio signal applied to the line. It was also found that there was a significant attenuation of the low frequency components of the audio signal applied to the line.

Figure 1:
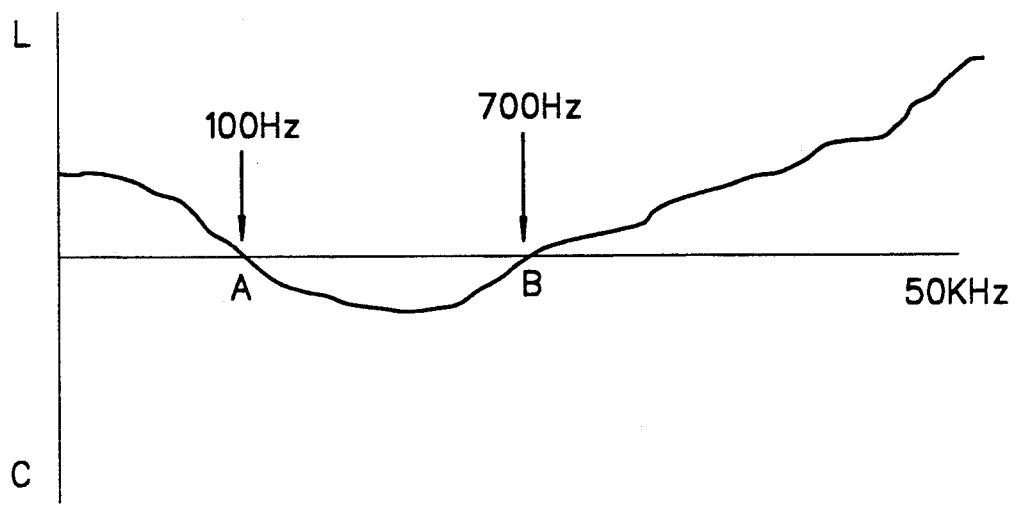
FIG. 1 is a diagram of the input impedance of a typical audio transmission line.

Referring to FIG. 1, there is shown a diagram of the input impedance of a typical audio transmission line comprising a first node A at 100 Hz and a second node B at 700 Hz, where L and C represent inductance and capacitance, respectively. From 0 Hz to node A the line is inductive. From node A to node B the line is capacitive. Beyond node B, the line is inductive. The change in the input impedance from being inductive to capacitive at node A and from being capacitive to inductive at node B with an accompanying switch in the phase relationship of the current and voltage at each of the nodes was found to give rise to the distortions described above.

Figure 2:
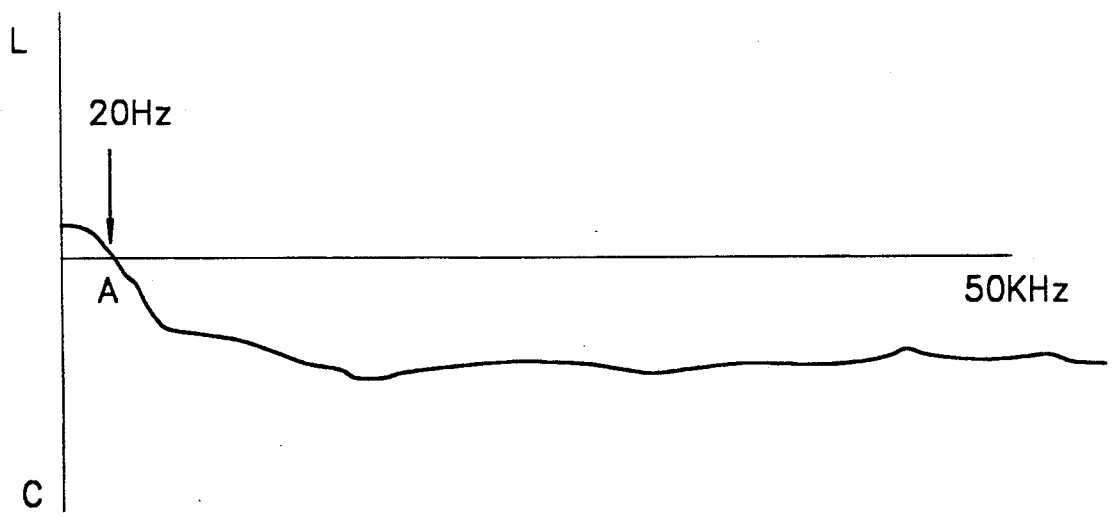
FIG. 2 is a diagram of the input impedance of an audio transmission line according to the present invention.

Referring to FIG. 2, there is shown a diagram of the input impedance of an audio transmission line according to the present invention. In the line of FIG. 2, node A is shifted down to a subsonic frequency, e.g. 20 Hz and node B is shifted up to a supersonic frequency, e.g. 1 MHz by adding either discrete and/or distributed capacitance in parallel with either or both of the wires in a typical audio signal transmission line. As can be seen from FIG. 2, with the additional capacitance in parallel with the line, the resulting input impedance of the line is capacitive throughout the audio spectrum and, there being no switching in the phase relationship of voltage and current throughout the audio spectrum, discernible audible distortions are substantially eliminated.

The added capacitance and the resulting elimination of the switching of the phase shift between the current and the voltage applied to the line was also found to reduce the attenuation of the low frequency signals throughout the audio spectrum.

Figure 3:
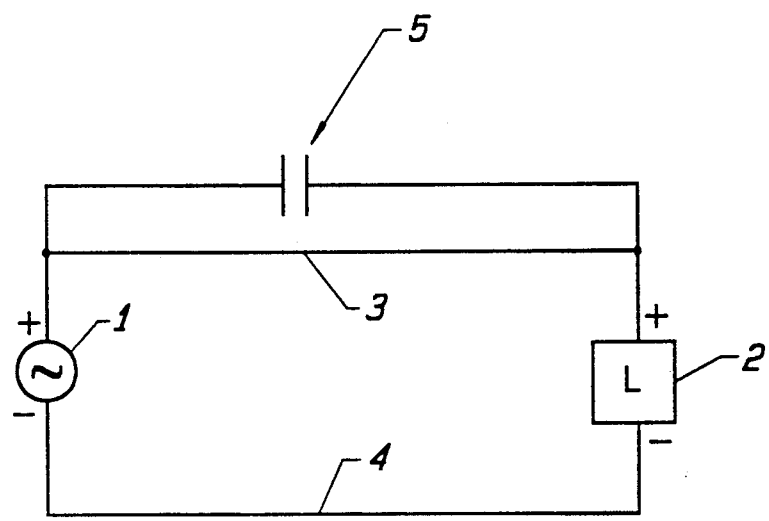
FIG. 3 is a schematic of a first embodiment of the present invention.

Referring to FIG. 3, transmission line according to a first embodiment of the present invention is shown connecting a source of audio signals 1 having a positive and a negative terminal and a load 2 having corresponding terminals. The transmission line comprises a pair of continuous electrical conductors 3 and 4. Coupled in parallel with the conductor 3 there is provided a discrete capacitor 5. The source 1 may comprise a preamplified, a power amplifier or any suitable source of audio frequency signals. The load 2 may comprise a preamplifier, power amplifier, speaker or other load, depending upon the nature of the source 1. The electrical conductors 3 and 4 may comprise a pair of parallel insulated wires, a pair of twisted insulated wires or a coaxial cable. They may be relatively short, e.g. 0.5 to 10 meters in length, for transmitting low level audio signals, e.g. less than 500 millivolts, or they can be long, e.g. 3-30 meters and beyond, for carrying high level audio signals, e.g. from 0.5 to 250 volts and higher. In an actual circuit, the capacitor 5 was provided with a magnitude in excess of 0.1 microfarads ($\mu F$), e.g. 0.22 $\mu F$. However, it appears that the largest capacitor, consistent with amplifier stability, should be used for maximum effectiveness in reducing low frequency signal attenuation and phase shift.

Figure 4:
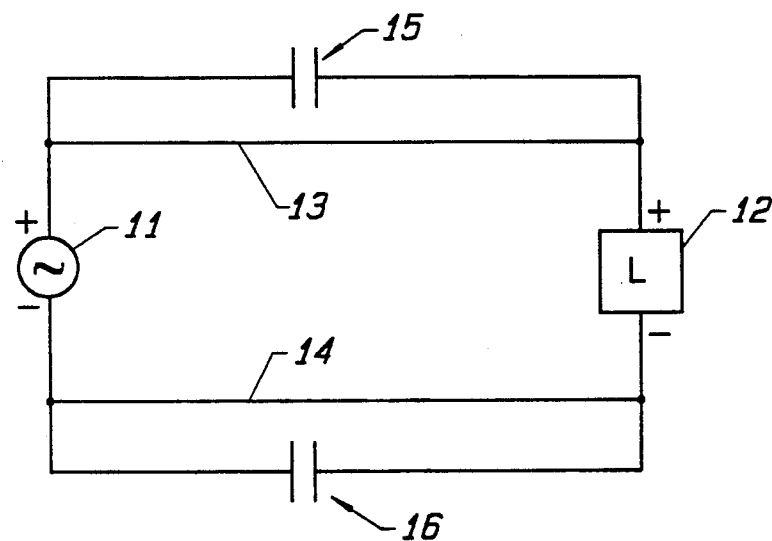
FIG. 4 is a schematic of a second embodiment of the present invention.

Referring to FIG. 4, there is provided in another embodiment of the present invention a transmission line for coupling an audio signal source 11 having a positive terminal and a negative terminal to corresponding terminals of a load 12 by means of a pair of continuous electrical conductors 13 and 14, respectively.

A discrete capacitor 15 is coupled in parallel with the electrical conductor 13 and a discrete capacitor 16 is coupled in parallel with the electrical conductor 14. As in the case of the circuit of FIG. 1, the capacitors 15 and 16, e.g. 0.22 $\mu F$, should be as large as possible. However, it has been observed that the addition of the capacitor 16 to the circuit does not provide a proportionate increase in the reduction in phase shift of the low frequency signals.

Figure 5:
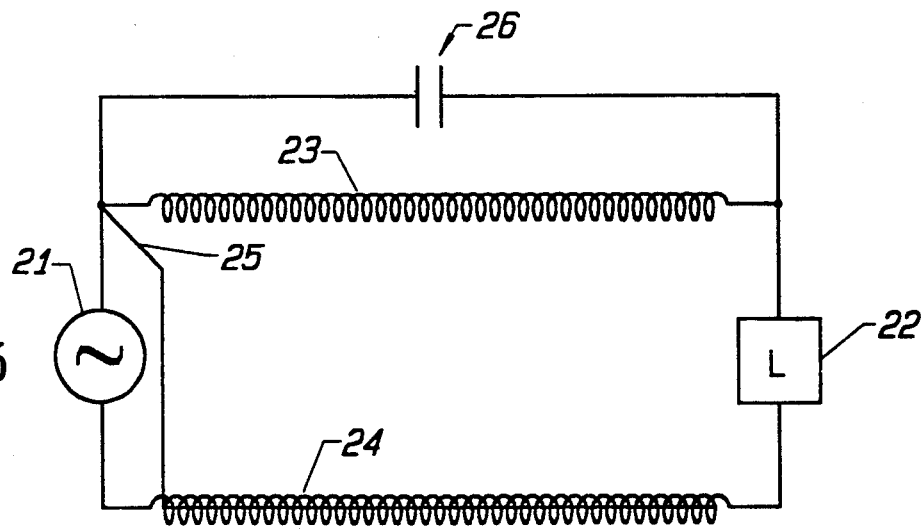
FIG. 5 is a schematic of a third embodiment of the present invention.

Referring to FIG. 5, there is provided in a third embodiment of the present invention a modification of applicant's high current demand cable disclosed in applicant's U.S. Pat. No. 4,718,100. In the embodiment of FIG. 5 there is provided a transmission line for coupling a source of audio signals 21 having a positive terminal and a negative terminal to corresponding terminals of a load 22 by means of a pair of helical continuous electrical conductors 23 and 24, respectively. A third electrical conductor 25 is provided to be coupled to the positive terminal of the source 21 and extends along the axis of the helical electrical conductor 24 toward the load end of the conductor 24. It should be noted, however, that the load end of the electrical conductor 25 is not terminated. Coupled in parallel with the electrical conductor 23 there is provided a discrete capacitor 26, e.g. 0.22 µF. Capacitor 26, which should be as large as possible consistent with stable operation, is coupled between the positive terminals of the source 21 and the load 22.

The electrical conductors 3, 5, 13, 14, 23, and 24 as shown in FIGS. 3-5 are described as being continuous so as to more clearly distinguish them from signal lines which comprise discrete resistive, capacitive and inductive components located between the ends thereof. In operation it has been observed that the presence of the capacitors 5, 15, 16 and 26 in each of the embodiments of FIGS. 3-5 reduces the attenuation and phase shift of audio signals applied to the transmission lines used for connecting the audio signal sources to the loads. By reducing the attenuation and phase shift of the low frequency signals relative to the high frequency signals, the quality of the audio signal transmitted between the audio signal sources and the loads is found to be significantly improved.

While a preferred embodiment of the present invention is described above, it is contemplated that various modifications may be made thereto without departing from the spirit and scope of the present invention. For example, the discrete capacitors described above with respect to FIGS. 3-5 may be larger than 0.1 µF, or smaller, particularly in high impedance circuits. Accordingly, it is intended that the embodiment described be considered only as an illustration of the present invention and that the scope thereof should not be limited thereto but be determined by reference to the claims hereinafter provided.

What is claimed is:

1. An audio frequency signal transmission line having an input impedance for transmitting audio frequency signals from a source of audio signals to a load comprising:
   a first and second continuous electrical conductor having no discrete resistive, capacitive or inductive components located between the ends thereof; and
   means for providing a capacitance coupled in parallel with at least one of said conductors such that a first and a second node at which the input impedance of said line changes from being an inductive impedance to a capacitive impedance and from a capacitive impedance to an inductive impedance, respectively, are located substantially outside of the audio frequency spectrum.

2. An audio frequency signal transmission line according to claim 1 wherein said means for providing a capacitance comprises a discrete capacitor.

3. An audio frequency signal transmission line according to claim 2 wherein said discrete capacitor has a capacitance in excess of 0.1 µF.

4. An audio frequency signal transmission line according to claim 1 wherein said capacitance providing means comprises means for providing a capacitance coupled in parallel with each of said first and said second conductors such that the node at which the input impedance of said line changes from being an inductive impedance to a capacitive impedance and from a capacitive impedance to an inductive impedance is located substantially outside of the audio frequency spectrum.

5. An audio frequency signal transmission line according to claim 4 wherein means for providing a capacitance coupled in parallel with each of said first and said second conductors comprises a first and a second discrete capacitor coupled in parallel with said first and said second conductors, respectively.

6. A method of making an audio frequency signal transmission line having an input impedance for transmitting audio signals from a source of said audio signals to a load comprising the steps of:
   providing a first and a second continuous electrical conductor having no discrete resistive, capacitive or inductive components located between the ends thereof; and
   providing a capacitance coupled in parallel with at least one of said conductors such that a first and a second node at which the input impedance of said line changes from being an inductive impedance to a capacitive impedance and from a capacitive impedance to an inductive impedance, respectively, are located substantially outside of the audio frequency spectrum.

7. A method according to claim 6 wherein said step of providing a capacitance comprises the step of providing a discrete capacitor.

8. A method according to claim 7 wherein said discrete capacitor has a capacitance in excess of 0.1 µF.

9. A method according to claim 6 wherein said step of providing a capacitance coupled in parallel with at least one of said conductors comprises the step of providing said capacitance in parallel with both said first and said second conductors.

10. A method according to claim 9 wherein said step of providing said capacitance in parallel with both said first and said second conductors comprises the step of providing a first and a second discrete capacitor in parallel with said first and said second conductors, respectively.

* * * * *